J. JOACHIM.
MANUFACTURE OF MORTAR.
APPLICATION FILED AUG. 5, 1913.

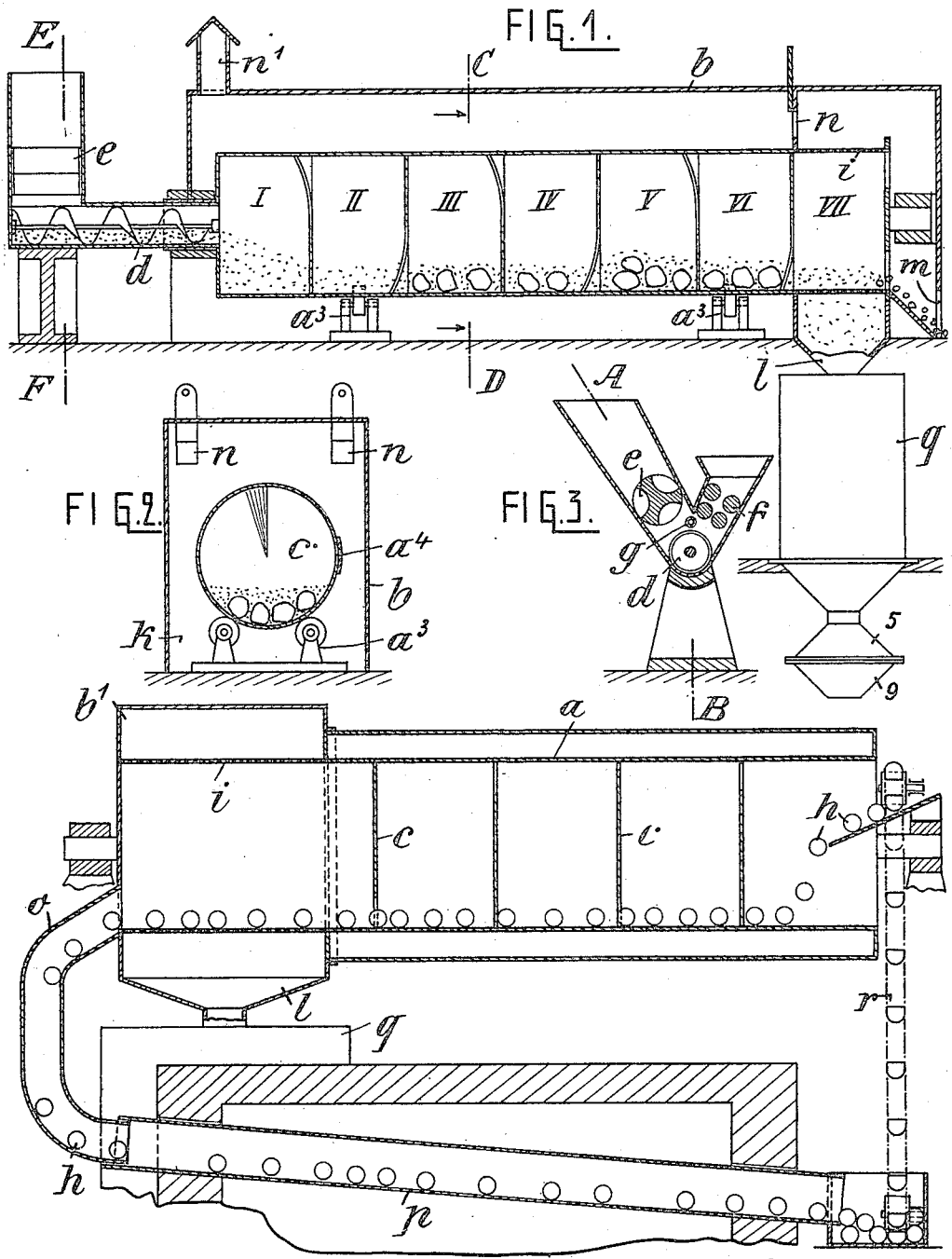

1,259,241.

Patented Mar. 12, 1918.
3 SHEETS—SHEET 2.

J. JOACHIM.
MANUFACTURE OF MORTAR.
APPLICATION FILED AUG. 5, 1913.
1,259,241.
Patented Mar. 12, 1918.
3 SHEETS—SHEET 3.
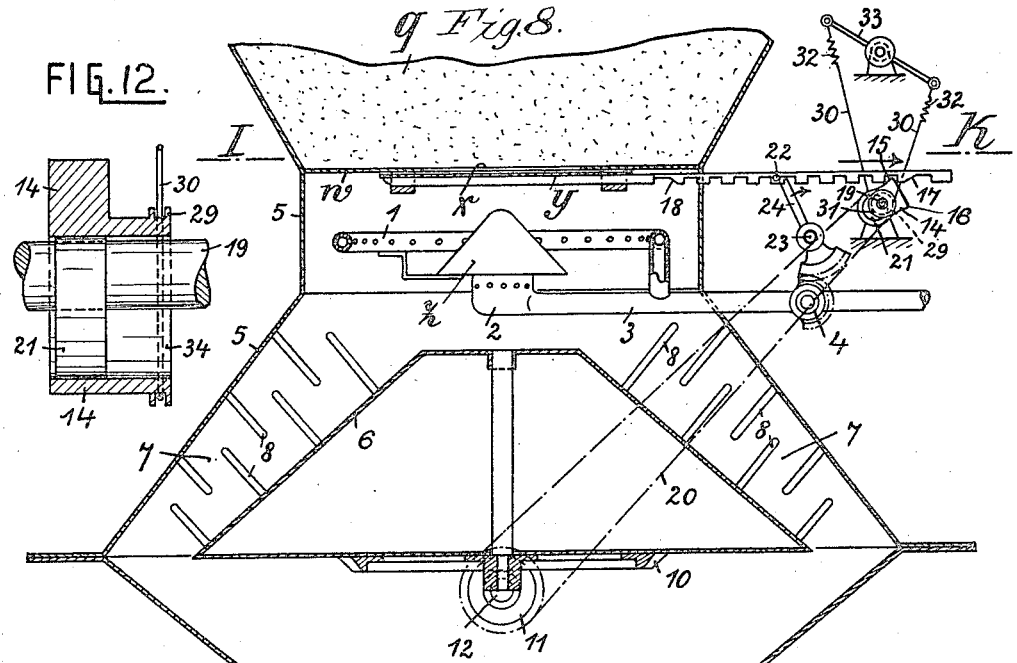
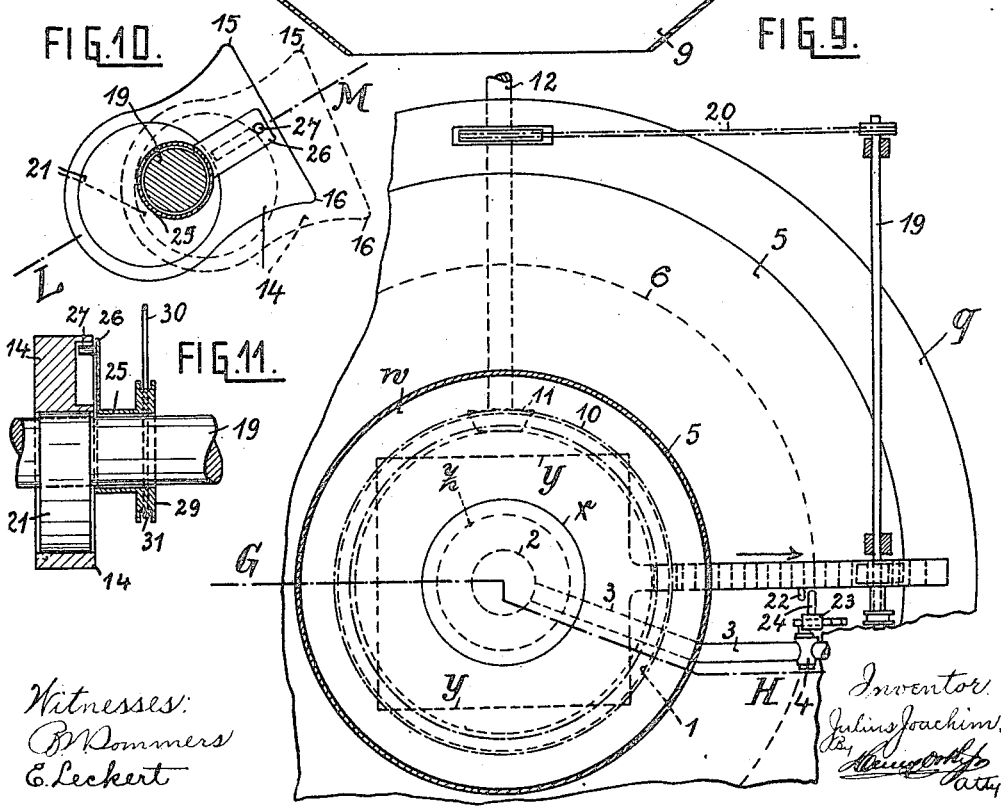
Witnesses:
B. Sommers
E. Leckert
Inventor
Julius Joachim

UNITED STATES PATENT OFFICE.

JULIUS JOACHIM, OF BERLIN, GERMANY, ASSIGNOR TO FIRM MORTELWERK JOLIET G. M. B. H., OF WAIDMANNSLUST, BEI HERMSDORF, GERMANY.

MANUFACTURE OF MORTAR.

1,259,241.     Specification of Letters Patent.     Patented Mar. 12, 1918.

Application filed August 5, 1913. Serial No. 783,209.

*To all whom it may concern:*

Be it known that I, JULIUS JOACHIM, manufacturer, a subject of the Emperor of Germany, residing in Berlin, and whose post-office address is 123 Chausseestrasse, Berlin, Germany, have invented certain new and useful Improvements in the Manufacture of Mortar; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The mechanism according to the present invention is to serve for the continuous manufacture of dry mortar from burnt lime, hydraulic lump lime, and pit sand without these ingredients having to be submitted to any preparatory treatment so that the product ready for being packed is produced in one single operation. By the moisture of the sand, which, if necessary, may be increased by a supply of water, the lime is slaked during this operation.

The new mechanism consists of a drum, in which the mortar is prepared in a slowly progressing operation in various stages by tumbling until a completely hydratized product is obtained, whereby the reaction heat produced by the slaking is utilized for heating up the freshly charged material, and of the silo receiving the finished product, in which silo the product is wetted slightly with the object of preventing its dusting, before it is filled into bags and the like.

The long drum, which may be single or multiple chambered and in which the continuous stream of material is made to advance slowly according to the slaking property of the lime by means of fixed, helical partitions, contains small disintegrating bodies, which may be specially heated, and which will crush the wetted lumps of lime and produce an absolutely homogeneous product; at the discharge end is provided a screening chamber for separating coarse foreign bodies, and the screened, pulverulent, dry product then falls into a silo, where it is slightly wetted before it is packed or filled into bags, so as to prevent its dusting. The utilization of the heat is obtained by the drum being surrounded by a casing, in which the surplus slaking heat is transmitted to the freshly introduced material. When several drums are arranged within each other, the heat is transmitted from one drum to the next and in the case of lime which is not readily slaked the slaking process may be promoted by introducing steam into the drum. This steam, for which exhaust steam is generally used, may, however also be introduced at the commencement of the process. The characteristic feature of the new arrangement is therefore a rotary single or multiple drum with peculiarly arranged partitions, heated disintegrating bodies of suitable shape, heat compensating casing and a communicating screening and wetting mechanism. The apparatus allows of producing a mortar free of granular lumps without storage under utilization of the entire slaking energy of the lime. It is out of question for the lime to be overburned.

In the accompanying drawings a constructional form of the new arrangement consisting of drum and silo is exemplified.

Figure 1 is a longitudinal section through the drum, the left side being taken along the line A—B in Fig. 3.

Fig. 2 is a cross section on the line C—D in Fig. 1.

Fig. 3 is a cross section on the line E—F in Fig. 1.

Fig. 4 is a longitudinal section through a drum with means for heating the disintegrating bodies and means for returning the latter.

Fig. 8 is a longitudinal section through a device for wetting the finished dry mortar, on the line G—H in Fig. 9.

Fig. 9 is a section on the line I—K in Fig. 8 with a view of the gearing.

Fig. 10 is an enlarged view of the eccentric and pawl.

Fig. 11 is a section on the line L—M in Fig. 10 moved into a vertical plane, and Fig. 12 is a modification of the pawl seen in section.

Figure 5:
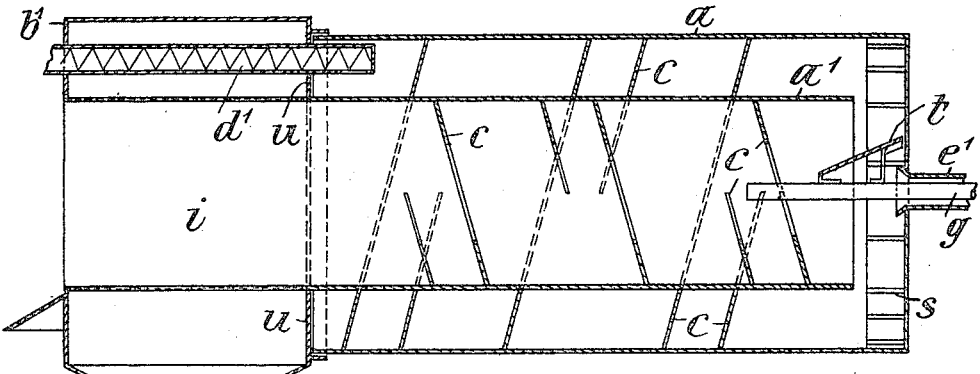
Figs. 5 and 6 illustrate double drums, and Fig. 7 three drums arranged within each other in longitudinal section.

The rotary drum $a$ is journaled on suitable standards $a^3$ in the casing $b$. This drum is subdivided by the fixed partitions $c$ into, say, seven chambers. In the present constructional form these partitions consist of round disks, having a slit at one radius and slightly bent open; the charge in the drum can therefore travel through these partitions in a slow, spiral stream only. The bent open slits are preferably made to alternate. The first two compartments or sections I and II are assumed to act as mixing and preheating chambers, they contain lime and sand only, which are supplied by the spiral conveyer $d$.

On the outside of the casing $b$ and above the conveyer $d$ are provided two hoppers. Of these the one contains the chambered roller $e$ for sand (Fig. 3), the other a roller feed gear $f$ for the crude lime. Above the conveyer $d$ a shower pipe $g$ is provided.

In the chambers III to VI of the drum are provided spherical or cubic bodies $h$ made of a light material such as wood, which roll and tumble about freely in the mortar. They are of such a size, relatively to the slits $c$, in that they will remain in their respective chambers, into which they are placed through manholes $a^4$ (Fig. 2). These bodies $h$ are heated by the heat produced by the slaking of the lime and thereby promote the slaking of the freshly supplied lime.

When, with an easily slaked lime, the output of the arrangement can be increased, the helical partitions are bent farther apart. Vice versa the gap is narrowed or the partitions are bent to a multiple thread for dealing with slowly slaking lime.

The last chamber VII is made as a screening chamber, the walls consisting of a suitable screening netting $i$, the size of the meshes of which is adapted to the kind of sand and mortar treated. Ahead of this screening chamber the casing $b$ is closed by a partition $k$. Beneath the screening shell is arranged a spout $l$ leading into the silo $q$ for the dry mortar, while the coarser stones continue their travel in the direction of the axis of the drum and are discharged at $m$. In the partition $k$ openings $n$ are provided (Figs. 1 and 2) having adjustable gates. When these gates are closed the compensation of the heat within the casing $b$ is effected by conduction only. When the gates are opened, the chimney $n^1$ at the front end of the casing will produce a current of the hot air in a direction contrary to that in which the material is traveling.

If the hereinbefore mentioned heating of the bodies $h$ by the heat of the slaking lime is not sufficient, these bodies may be heated, Fig. 4, in a separate plant outside of the slaking drum, either by direct fires or by waste gases to a high temperature, for instance 300–400 degrees centigrade.

The double-walled slaking drum $a$ is shown in Fig. 4 fitted with straight partitions $c$ and a screening chamber $i$. The bodies $h$ can pass through the openings in the partitions. From the closed cylindrical chamber $b^1$ surrounding the screening chamber $i$ the finished mortar is discharged at $l$ into the silo $q$. The disintegrating bodies $h$ falling from the interior of the drum and the chamber $i$, stones and coarse lumps of lime travel down a chute $o$ to the heating tube $p$. This tube $p$ is either inclined or fitted with a spiral conveyer, and it may be either stationary or rotatable. The heating of the bodies $h$ is obtained either by direct fire from outside or by the hot gases from a boiler furnace which is drawn through the drum in a direction contrary to the travel of the disintegrating bodies. The heated disintegrating bodies $h$ fall from the heating drum into a bucket elevator $r$, by which they are returned to the entrance into the slaking drum.

Figure 6:
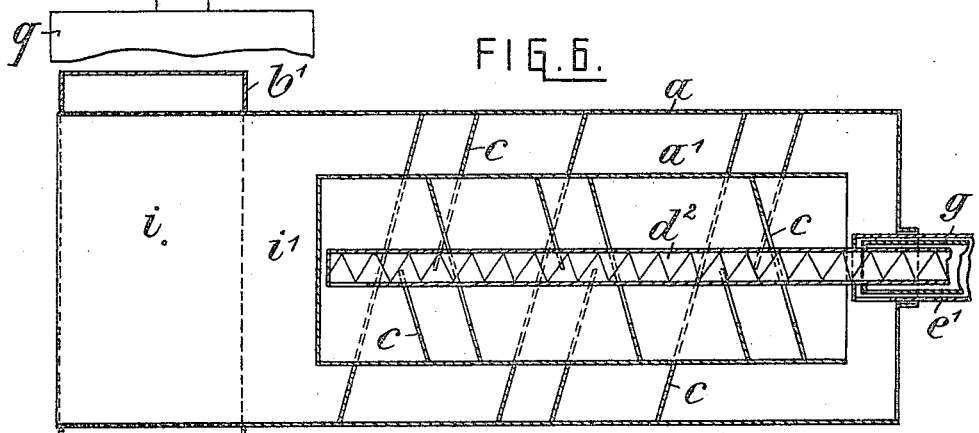
Figure 7:
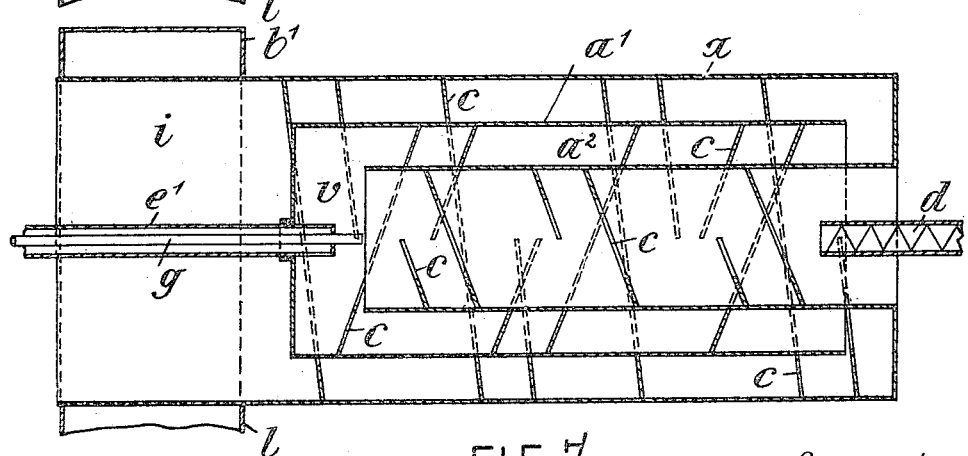

In many instances it will, however, not be sufficient to treat the mortar in a single drum, and, for the purpose of obtaining a continuous process, several drums are then arranged one within the other and the necessary water and sand is then added during the passage from one drum into the next, as this is shown in Figs. 5 to 7.

In the arrangement according to Fig. 5 the mixture of lime and sand and the bodies $h$ are introduced into the outermost drum $a$ by means of the spiral conveyer $d^1$ transecting the wall $u$. The charge travels through this drum $a$ in the direction of the arrows and is thereupon conveyed by means of buckets $s$ and a chute $t$ into the inner drum $a^1$. This inner drum recedes somewhat relatively to the rear wall of the outer drum. Through this wall pass the water supply pipe $g$ and the sand supply tube $e^1$. At the other end the inner drum projects beyond the outer drum, and this projecting part of the inner drum is made in form of a screening chamber $i$.

According to Fig. 6 the lime is preliminarily slaked in the inner drum $a^1$, and definitely slaked in the outer drum $a$. The two drums are completely closed at opposite ends, so that the heat cannot escape. The closing wall of the outer drum $a$ is penetrated by a long spiral conveyer $d^2$ which conveys the raw mixture of lumps of lime, sand and some water to the closed end of the inside drum $a^1$ at the left. The mortar mixture then travels contrary to the direction in which it was introduced to the closed end of the outer drum $a$ and falls down into the same. Around the spiral conveyer $d^2$ are arranged the water jet pipe $g$ and the sand supply tube $e^1$. To the ring-shaped chamber of the outside drum is connected an open cylindrical chamber $i^1$, in front of which the screening chamber $i$ is arranged.

When the arrangement is composed, as shown in Fig. 7, of three drums, the ingredients for making the mortar are introduced by means of the spiral conveyer $d$ into the innermost drum $a^2$. From this drum the charge falls directly into the middle drum $a^1$, which contains in its free end the water jet pipe $g$ and the sand supply tube $e^1$. After the mortar mixture has traveled through the middle drum it falls into the outer drum $a$. This drum ends, the same as with the other constructional forms, in a screening chamber $i$, from which the mortar is discharged at $l$ into the silo $q$. $c$ are again the helical partitions.

The mortar thus produced is, however, not ready for packing, as it has to be wetted before packing or filling into bags and the like in order to prevent its dusting. This is done in the lower part of the silo, Figs. 8–12, in the bottom $w$ of which a circular hole $x$ is provided, which is closed by a sliding gate $y$. Concentrically under this hole is disposed a distributing cone $z$ and around the hole and under the cone are disposed shower pipes 1, 2. The cone and the shower pipes are supported by the water supply pipe 3, in which a tap or cock 4 is provided before it is branched. The shell 5 which in its upper part is cylindrical and below is conically enlarged contains the rotatable cone 6. The space between these parts, 7, which will give the material rushing down the form of a hollow cone is contracted below. Into this space project rods 8 arranged alternatingly on the inside and the outside cones. The material falling through this space 7 is again collected by the hopper 9.

Beneath the rotatable cone 6 is arranged a toothed wheel 10, which is rotated by means of a bevel wheel 11 on the shaft 12. From this shaft also the intermittent opening and closing of the gate $y$ and of the water cock 4 is operated in the following manner:

To the gate $y$ is secured a rack 13, in which the reversible pawl 14 is adapted to engage either with the tooth 15 or with the tooth 16. The rack 13 has two teeth 17, 18 of a peculiar beveled shape, the distance between which corresponds to the inside width of the opening $x$. The pawl 14 is eccentrically fitted on shaft 19, which is driven by a chain 20, indicated in Figs. 8 and 9 from the main shaft 12. On the shaft 19 is rigidly fitted the eccentric 21 revolving in the pawl and advancing it against the teeth of the rack 13. At the position shown in Fig. 8 the tooth 15 of the pawl would impart to the rack a sliding motion toward the right, thereby opening the hole $x$. As soon as the bevel tooth 18 of the rack is reached, the action of the pawl will cease. The pawl, however, will continue to revolve. Simultaneously with the opening of the gate $y$ for the hole $x$ the water cock 4 is opened by means of a lug 22 on the rack 13, displacing the segment lever 24 pivoting on 23.

For reversing the pawl a dog gear 25 is loosely mounted on shaft 19 (Fig. 10), the lever 26 of which gear engages with a pin 27 in the slot 28 of the pawl 14. To the outer end of the dog 25 is fitted a cord pulley 29 over which runs a cord 30. This cord is secured to the middle of the pulley at 31. Its ends are attached to a lever 33, springs 32 being provided in the lengths of the cord. When the lever 33 is reversed, which may be done by the operator, also the pawl will be reversed. Then the tooth 16 will operate and advance the rack to the left, thereby closing the gate and the water cock.

Fig. 12 illustrates a modified form of the dog gear for the pawl. Here cord pulley 29 and pawl 14 are made in one piece, the eccentric revolving loose in the bore 34. In this case the direction of the operation is reversed by reversing the eccentric.

I claim:

1. In a mortar making machine, a plurality of concentric communicating drums, means for supplying water to the charge of said drums where the same passes from one drum into the other, helical partitions dividing the drums into several communicating chambers adapted to thoroughly mix and work up the raw materials, means for feeding said raw materials into said drums, a receptacle, means forming a part of a drum for screening the finished product and discharging the same into said receptacle, means for slightly wetting the finished product, and means for utilizing the surplus heat produced by the slaking of the lime for heating the raw materials supplied to the drums.

2. In a mortar making machine, several concentric drums communicating with one another at their ends, means for supplying water to the charge at the parts where the same passes from one drum into the other, helical partitions dividing the drums into several communicating chambers adapted to mix and thoroughly work up the raw materials, a conveyer penetrating the end wall of the outermost drum, means to charge the outermost drum at its closed end, a receptacle, means forming a continuation of the outer drum for screening the finished product and discharging the same into said receptacle, means at the discharge end of said receptacle for slightly wetting the finished product, and means for utilizing the surplus heat produced by the slaking of the lime for heating the raw materials as they are fed.

3. In a mortar making machine, several concentric communicating drums, means to supply water to the charge where the same passes from one drum into the other, helical partitions dividing said drums into several chambers adapted to thoroughly mix and work up the raw materials, a conveyer penetrating the end wall of the outermost drum, a separate sand supply tube projecting into the latter, a receptacle, means forming a continuation of the outer drum for screening the finished product and discharging it into the receptacle, means for slightly wetting the finished product and means for utilizing the surplus heat produced by the slaking of the lime for heating the material being fed.

4. In a mortar making machine, an outer drum closed at one end, an inner concentric drum closed at one end and open adjacent the closed end of the outer drum, a conveyer projecting through the closed end of the outer drum and extending into the inner drum adjacent its closed end, helical partitions in said drums arranged to mix and move the charge therein away from their closed ends, means to supply water to the charge where the same passes from the inner to the outer drums, means to supply sand to the charge where it passes from the inner to the outer drum, and means at the open end of the outer tube and forming a continuation thereof for screening the finished product.

In testimony that I claim the foregoing as my invention, I have signed my name in presence of two subscribing witnesses.

JULIUS JOACHIM.

Witnesses:
WOLDEMAR HAUPT,
HENRY HASPER.

Copies of this patent may be obtained for five cents each, by addressing the "Commissioner of Patents, Washington, D. C."